United States Patent
Reijersen Van Buuren

(10) Patent No.: US 10,617,062 B2
(45) Date of Patent: Apr. 14, 2020

(54) APPARATUS AND METHOD FOR FORMING AND EJECTING A BALE DEPENDING ON A RAMP SENSOR

(71) Applicant: LELY PATENT N.V., Maassluis (NL)

(72) Inventor: Willem Jacobus Reijersen Van Buuren, Dirksland (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 16/333,372

(22) PCT Filed: Sep. 15, 2017

(86) PCT No.: PCT/NL2017/050605
§ 371 (c)(1),
(2) Date: Mar. 14, 2019

(87) PCT Pub. No.: WO2018/056805
PCT Pub. Date: Mar. 29, 2018

(65) Prior Publication Data
US 2019/0208709 A1 Jul. 11, 2019

(30) Foreign Application Priority Data

Sep. 23, 2016 (DE) .................. 10 2016 118 003
Sep. 26, 2016 (NL) ...................................... 2017531

(51) Int. Cl.
*A01F 15/08* (2006.01)
*A01F 15/07* (2006.01)
(52) U.S. Cl.
CPC ...... *A01F 15/0883* (2013.01); *A01F 15/0705* (2013.01); *A01F 15/0875* (2013.01)

(58) Field of Classification Search
CPC ............. A01F 15/0883; A01F 15/0875; A01F 15/0705; A01D 90/10
USPC ........................................... 100/7, 88, 188 R
See application file for complete search history.

(56) References Cited

U.S. PATENT DOCUMENTS

| | | | |
|---|---|---|---|
| 7,331,279 B2 | 2/2008 | Biziorek et al. | |
| 2009/0223196 A1* | 9/2009 | Smith | A01F 15/0883 56/341 |
| 2012/0189417 A1* | 7/2012 | Blough | A01F 15/0883 414/519 |
| 2013/0074709 A1 | 3/2013 | Thompson et al. | |
| 2015/0272007 A1 | 10/2015 | Smith | |

FOREIGN PATENT DOCUMENTS

| | | |
|---|---|---|
| EP | 1151657 A1 | 11/2001 |
| EP | 1266563 A1 | 12/2002 |
| EP | 1444882 A2 | 8/2004 |

OTHER PUBLICATIONS

European Patent Office, International Search Report for related International Application No. PCT/NL2017/050605, dated Jan. 5, 2018.

* cited by examiner

*Primary Examiner* — Jimmy T Nguyen

(57) ABSTRACT

A bale forming device forms a bale in a bale forming chamber surrounded by a casing. A discharge gate actuator moves a discharge gate from a closed position into an opened position. The formed bale is ejected out of the casing and drops onto a ramp. A ramp sensor detects the bale dropping onto the ramp and triggers the discharge gate actuator to stop opening the discharge gate.

14 Claims, 5 Drawing Sheets

APPARATUS AND METHOD FOR FORMING AND EJECTING A BALE DEPENDING ON A RAMP SENSOR

FIELD OF THE INVENTION

The invention refers to a bale forming apparatus and to a bale forming method for forming in the interior of a casing a bale from loose material, in particular a round-cylindrical bale from agricultural crop material, and for ejecting the formed bale out of the casing.

BACKGROUND OF THE INVENTION

A bale forming apparatus for agricultural purposes forms a round-cylindrical or cuboid bale in a bale forming chamber which is surrounded by a casing. After having formed the bale, the bale forming apparatus opens a discharge gate, e.g. a tailgate or a flap, of the casing and ejects the formed bale out of the casing. Several proposals how to do so have been made.

U.S. Pat. No. 7,331,279 B2 discloses a round baling press 10 which forms round-cylindrical bales 24 in a press chamber 22. A rear door 26 can pivot around a horizontal axis 28 with respect to the front housing. A hydraulic actuator 30 can pivot the rear door 26 upwards against the force of gravity such that a formed bale 24 can be ejected out of the press chamber 22. A sensor arrangement with three different sensors 38, 42, 44 can record the actual position of the rear door 26. The following position sensors are mentioned: A rotary potentiometer 38 records the rotational angle of the door 26 around the axis 28. An ultrasonic range sensor 42 measures the distance between the lower (outer) end of the rear door 26 and the ground. A flow sensor 44 measures the hydraulic fluid which flows into or out of the hydraulic chamber of the actuator 30. An electronic control 46 receives signals from the sensor arrangement 38, 42, 44. The electronic control 46 regulates the opening of the rear door 26 performed by the actuator 30. In one implementation the rear door 26 moves slowly at the beginning of the opening movement, relatively quickly in an intermediate phase, and again relatively slowly towards the end of the opening movement. In one implementation a bale size sensor 103 continuously senses the size of the bale 24. The actuator 30 opens the rear door 26 depending on the measured bale size.

EP 1444882 A2 discloses a round baler (Rundballenpresse) with a stationary front housing (Vordergehause 5) and a pivotal rear housing (Hintergehäuse 9). Thanks to a pivoting bearing (Schwenklager 8) the rear housing 9 can pivot with respect to the front housing 5. Two single acting hydraulic cylinders 14 can move the rear housing 9 with respect to the front housing 5 from a closed position 13 via an intermediate position 12 towards a fully open position 10. A control valve (Steuerventil 18) operates as a throttle valve and decelerates the rear housing 9 shortly before the moved rear housing 9 reaches the fully open position 10 or the fully closed position 13. In an alternative implementation two double acting hydraulic cylinders 23 are used. Two sensors 16, 17 measure the current position of the piston of the cylinder 13, i.e. the current stroke, and therefore a value indicative of the position of the rear housing 9. A control unit 33 receives signals from the sensors 16, 17. Depending on the sensor signals the control unit 33 decelerates the movement of the rear housing 9 by controlling a control valve 34. In one implementation the following further sensors are implemented: a rotary potentiometer (Drehpotentiometer 39) which measures the position of the rear housing 9 with respect to the front housing 5, a pressure sensor (Drucksensor 40) which measures the pressure of the hydraulic fluid in a line guiding to the rear housing actuator, a sensor 41 which detects the event that a severing device for severing a web of wrapping material is actuated, and a sensor 43 in a pivotal ramp (Ballenabrolleinrichtung 44) which detects the event that the round bale has left the pivoting area of the rear housing 9 and the situation that the rear housing 9 can be lowered downwards.

US 20150272007 A1 discloses a round baler with a bale chamber 26. An actuator assembly 32 can move the tailgate 30 from a closed position into an opened position. The tailgate 30 moves along a path 50, cf. FIG. 2. A bale position sensor 40 is mounted at the free end of a bale ramp 38. The ejected bale 28 drops onto the ramp 38 and is guided away from the bale chamber 26 by the ramp 38. The ramp 38 can carry the bale 28 in a so-called cleared position in which the tailgate 30 can be closed again while the bale 28 is still on the ramp 38. The bale position sensor 40 detects the event that the ejected bale 28 has reached the end of the ramp 38 and is in the cleared position. This detection triggers the step that the tailgate 30 is closed again.

EP 1266563 A1 discloses a baler-wrapper combination with a round baler 1 and a wrapper 3. The round baler 1 forms a round bale 42 in a baler chamber 4 and ejects the formed bale. The ejected bale rolls over a chute device onto the wrapping table of the wrapper 3. In a first embodiment, cf. FIG. 1 to FIG. 3, the bale rolls over a first chute device 20 with two ramps 26 and a second chute device 21 onto the wrapping table. Hydraulic cylinders 31 can move the chute device 20 from a rest position 32, cf. FIG. 1, into a working position 22, cf. FIG. 3. The cylinders 31 are activated by a sensor 35 which detects the event that the discharge gate (rear housing 10) reaches a specific intermediate position when being opened. A feeler means 53 detects the event that the round bale 42 has reached an end position on the second chute device 21. A signal from this feeler means 53 triggers the step of closing again the rear housing 10. In a second embodiment shown in FIG. 8 and FIG. 9 a chute device 75 comprises a swivel arm arrangement 78 with forwardly directed arms 79 and a U-shaped stirrup 80. The stirrup 80 comprises rearwardly directed arms 81 which form a ramp 82 for guiding an ejected round bale 83. A control rod 87 connects the swivel arm arrangement 78 with the rear housing 88. A tension spring 89 tends to pull the stirrup 80 into a rest position 90 while the rear housing 88 is closed.

SUMMARY OF THE INVENTION

A problem solved by the invention is to provide a bale forming apparatus with the features of the preamble of claim 1 and a bale forming method with the features of the preamble of claim 11 wherein it is not necessary that the discharge gate is moved into the fully opened position for every bale and under every condition and wherein it is possible but not necessary to control the process of opening the discharge gate depending on a bale dimension or a measured current position of the moved discharge gate.

This problem is solved by a bale forming apparatus with the features of claim 1 and by a bale forming method with the features of claim 11. Preferred embodiments are specified in the depending claims.

The bale forming apparatus according to the invention comprises
a bale forming device,
a casing comprising a moveable discharge gate,
a discharge gate actuator,
a bale ramp, and
a ramp sensor.

The bale forming device provides a bale forming chamber. The casing with the discharge gate surrounds the provided bale forming chamber.

The discharge gate can be moved between a closed position and a fully opened position. The discharge gate actuator can move the discharge gate from the closed position into an opened position. This opened position of the discharge gate is taken from a set of different possible opened positions. Every possible opened position is either the fully opened position or an intermediate position between the closed and the fully opened position.

The bale forming device can form a bale in the provided bale forming chamber. While the bale is formed in the bale forming chamber, the discharge gate is in the closed position. For ejecting the formed bale the discharge gate actuator moves the discharge gate out of the closed position. The discharge gate terminates its movement away from the closed position when reaching the opened position even if this open position is not the fully opened position but an intermediate position.

The bale forming apparatus can eject a formed bale out of the casing surrounding the bale forming chamber while or after the discharge gate is moved into an opened position. This opened position can be an intermediate position, i.e. the bale can be ejected with the discharge gate not being fully opened.

The ramp is positioned vertically or angularly below the discharge gate at least when the discharge gate is in an opened position. An ejected bale drops onto the ramp.

The ramp sensor can automatically detect the dropping event—that is the event that a bale drops onto the ramp. The detection of a dropping event triggers the step that the discharge gate actuator terminates the movement of the discharge gate away from the closed position and therefore the event that the discharge gate is stopped in the opened position.

The bale forming method according to the invention comprises the corresponding steps. The opened position which is taken when a bale is ejected depends on the detection of the dropping event for this bale.

ADVANTAGES

According to the invention an ejected bale is not directly deposited on the ground but drops onto the ramp. The ramp decelerates the movement of the ejected bale towards the ground and guides the ejected bale away from the casing with the bale forming chamber. Thanks to the ramp the discharge gate can be closed earlier.

In contrast to balers known from the prior art the dropping event is not or not only used for triggering the closing of the discharge gate but is used for stopping the opening movement. The advantages are explained in the following.

Thanks to the bale ramp sensor the dropping event is automatically detected. According to the invention the detection of the dropping event triggers the step that the discharge gate actuator terminates the discharge gate movement away from the closed position. Thanks to this feature the tailgate is often only opened as much as necessary and not necessarily into the fully opened position. After the bale drops onto the ramp and the ramp sensor detects the dropping event, it is often not necessary to move the discharge gate further away from the closed position—or only along a given shorter distance. When the dropping event is detected, the bale has already entirely left the casing surrounding the bale forming chamber. Therefore the movement can now be terminated without the risk that the ejected bale hits the discharge gate when the bale moves away from the casing. In many cases the movement of the discharge gate is stopped as triggered by the dropping event before the discharge gate reaches the fully opened position. In particular in the case that the bale forming apparatus can form bales with different sizes and the current bale is significantly smaller than a bale with a maximal possible dimension the movement of the discharge gate is terminated significantly before it reaches the fully opened position.

According to the invention the discharge gate movement is automatically terminated triggered by the automatically detected dropping event that the bale drops onto the ramp. The effect of this feature is that the discharge gate is opened only to that extent which is required for securely removing the entire bale out of the casing. Often it suffices that the discharge gate is only moved into an intermediate opened position and not to the fully opened position. In this case the discharge gate is moved over a shorter distance—compared with movement into fully opened position. Therefore time for ejecting the bale and energy for moving the tailgate against the force of gravity are saved. Further time is saved when closing the discharge gate again starting from an intermediate position and not from the fully opened position. The throughput through the bale forming apparatus is increased.

It is possible that the bale forming apparatus comprises a bale size sensor. In the case of a round baler with a bale forming chamber of variable size this bale size sensor measures a value indicative of the bale diameter. Such a bale size sensor is in particular used for comparing the actual size of the bale in the bale forming chamber with a given required final bale size while the bale is formed. The formation of the bale is completed if the required bale size is reached and at least one surface of the bale is wrapped while the bale is in the interior of the casing. It is also possible that the discharge gate actuator operates depending on signals from the bale size sensor. But thanks to the invention such a bale size sensor is not required for controlling the movement of the discharge gate or the operation of the discharge gate actuator.

It is further possible that a gate position sensor measures the current position of the discharge gate while the discharge gate is moved. But thanks to the invention the discharge gate is opened only to the required amount without the need of using a position sensor for the discharge gate and is stopped triggered by the dropping event and not necessarily stopped depending on the current discharge gate position. Therefore the invention saves the need of providing a gate position sensor and a sensor monitor on board of the bale forming apparatus. Thanks to the invention the advantage of opening the discharge gate only as far as possible can be achieved without a gate position sensor.

It is possible that the movement of the bale from the bale forming chamber onto the ramp depends on external conditions, e.g. the inclination of the baler—in particular if the baler belongs to a vehicle—or on the weight or size or specific weight of the bale or on the friction between the bale and the bale forming device, e.g. the chamber side walls. Therefore the movement can vary from bale to bale even if all bales have the same size.

Thanks to the feature that the dropping event triggers the movement termination for the discharge gate movement it is possible but not necessary to provide a sensor for an external condition or for the bale weight or size or for the friction. According to the invention the tailgate movement is terminated triggered by the event that the bale actually drops onto the ramp.

Often the invention can be implemented on board of an existing bale forming apparatus. Typically such a bale forming apparatus comprises a bale forming device providing a bale forming chamber, a casing with a pivotal discharge gate, a discharge gate actuator, a bale ramp and a control unit which is arranged for executing control software and thereby for controlling the discharge gate actuator and further baler parts. In some conventional balers a ramp sensor is always mounted angularly below the bale forming chamber and is used for triggering the closing of the discharge gate. Otherwise only the ramp sensor needs to be added to the existing bale forming apparatus. In addition the control software has to be adapted to make the bale forming apparatus operating according to the invention. Therefore the invention can be implemented on the existing bale forming apparatus with a relatively small amount of work, often purely by amending the control software and without adding or amending any mechanical part.

PREFERRED EMBODIMENTS

In one embodiment the bale ramp comprises a pivotal ramp part. It is possible that the entire ramp is pivotal. A biasing member tends to pivot the ramp part into a raised position. The weight of the ejected bale pivots the ramp part into a lowered position against the force of the biasing member. Pivoting downwards the rump part decelerates the bale movement. The ramp sensor detects at least one of the events that the ramp part is in the raised position or in the lowered position or in an intermediate position. If the ramp sensor detects that the ramp part is in the lowered or intermediate position and/or does not detect that the ramp part is in the raised position, the ramp sensor has detected the dropping event.

In one implementation the ramp sensor can detect the event that the pivotal ramp part reaches one of the two final positions. The dropping event is detected if the ramp sensor detects that the pivotal ramp part is in the lowered position and is not in the raised position. This implementation provides redundancy.

In one implementation the ramp sensor comprises a contact switch. The contact switch is actuated if the pivotal ramp part is in the lowered position. It is possible that a further contact switch is actuated if the ramp part is in the raised position.

In one embodiment the ramp comprises at least one movable part which comes in contact with the ejected bale, e.g. at least one idle roller. The ramp sensor detects the event that the or at least one ramp part is moved with respect to the rest of the ramp, e.g. a roller is rotated or moved perpendicular to the roller axis. This event is a clue that a bale drops onto the ramp and moves the part.

In one embodiment a scale is integrated into the bale ramp. This scale measures a value indicative of the weight of a bale on the ramp. The scale can comprise a movable part integrated into the ramp. This measured bale weight can be recorded. Signals from this scale are used for detecting the dropping event. Therefore the scale further serves as the ramp sensor. Signals from the scale are therefore used for deriving the weight of the ejected bale as well as for terminating the discharge gate movement.

In one embodiment the discharge gate actuator comprises at least one piston-cylinder unit, preferably two synchronized piston-cylinder units. The discharge gate is opened by expanding the or every piston-cylinder unit. The fully opened position is defined by the maximal possible stroke of the or every piston-cylinder unit. An intermediate position of the or every piston yields an intermediate position of the discharge gate. Thanks to the invention it is not in every case necessary to free expand the or every piston-cylinder unit. In a further embodiment a stop element limits the movement of the discharge gate away from the closed position and defines the fully opened position.

It is possible that the discharge gate actuator moves the discharge gate close to the fully opened position and that no dropping event is detected before the discharge gate approaches the fully opened position. One reason may be that of the bale is very large, e.g. has the maximal possible dimension, or is not properly ejected or that high friction between the bale and the bale forming device occurs or that the ramp sensor malfunctions. In the case that the bale forming apparatus belongs to a vehicle the current inclination may also be a reason.

In one embodiment the discharge gate is moved with normal velocity into the fully opened position. In a preferred embodiment, however, a decelerating device decelerates the discharge gate movement before the discharge gate reaches the fully opened position. Thereby end-position dampening is performed. The end-position dampening can be integrated into the discharge gate actuator, e.g. in the form of a stroke sensor, or can be triggered by a sensor which detects that the discharge gate approaches the fully opened position. Thanks to the end-position dampening it is avoided that a heavy jerk causes mechanical stress to the discharge gate or to a further part of the casing when the discharge gate reaches the fully opened position with high velocity.

In one embodiment the discharge gate actuator decelerates and thereby terminates the discharge gate movement immediately when the dropping event is automatically detected. This embodiment saves time. In a further embodiment the discharge gate actuator starts to decelerate and thereby to terminate the discharge gate movement after the dropping event it detected and a time span has passed. This event increases the reliability as the risk is further reduced that the ejected bale hits the discharge gate.

In one implementation the time span for the discharge gate actuator is given in advance and remains constant from bale to bale. In a further implementation this time span depends on an operational parameter which is measured during operation and can vary from bale to bale. This parameter can be a property of the bale, e.g. a bale dimension or the bale weight, or the friction between the bale and the casing, e.g. the casing side walls. The parameter can also be an environmental characteristic, e.g. the current inclination of the bale forming apparatus or the moisture of loose material or of the air. Preferably this inclination is the tilting angle of the bale forming apparatus with respect to a horizontal position around an axis wherein this axis is perpendicular to the direction of movement of the discharge gate. In the case of a bale forming apparatus belonging to a vehicle this inclination axis is preferably perpendicular to the travelling direction of the vehicle.

Preferably an electronic control unit receives signals from the ramp sensor and automatically generates control inputs for the discharge gate actuator depending on ramp sensor signals. The control unit can be mounted on board of the bale forming apparatus itself or on board of a vehicle which is in data connection with the bale forming apparatus or is implemented on a mobile device, e.g. a smartphone.

The invention can be used on board of a round baler with a drum-shaped bale forming chamber. This bale forming chamber can have a variable size. The round baler can therefore subsequently form bales with different diameters. It is possible but not necessary that the discharge gate actuator moves the discharge gate depending on the measured actual or given required bale diameter.

The round baler using the invention can also have a bale forming chamber with a fixed size, i.e. every formed round-cylindrical bale has the same diameter. Nevertheless the time period which passes between ejecting the bale and the dropping event may vary from bale to bale, e.g. due to different inclination values while the bale forming apparatus is moved over ground or friction values between the bale and bale forming device.

The baler can also be a square or cuboid baler with a pressing channel. The discharge gate may be a pivotal flap mounted at the end and at the top of the pressing channel. The ramp may be a chute mounted at the bottom of the channel end.

The bale forming apparatus can belong to a self-propelled or pulled vehicle which is moved over ground. The bale forming apparatus can also be implemented as a stationary device.

In one embodiment at least one surface of the bale is wrapped while the bale is still in the interior of the casing. The wrap prevents the ejected bale from falling apart. In one configuration the bale forming apparatus presses and wraps the bale in the bale forming chamber. In a further configuration the pressed bale is moved out of the bale forming chamber and into a further chamber also surrounded by the casing and is wrapped in the further chamber. The discharge gate is in the closed position or in an intermediate position while the bale is wrapped.

These and other aspects of the invention and of the preferred embodiment will be even more apparent from the detailed embodiment as described below and will be elucidated in detail there.

DETAILED DESCRIPTION OF EMBODIMENT

In the embodiments described below the invention is used on board of a round baler for agricultural purposes. This round baler is moved over ground in a travelling direction TD and operates as follows:

The round baler picks up from the ground or otherwise receives loose crop material (hay, straw, silage, e.g.).

The round baler conveys the received crop material through a feeding channel into a drum-shaped bale forming chamber provided by a bale forming device which is surrounded by a casing.

Optionally the received crop material is cut while being conveyed through the feeding channel.

The received and optionally cut crop material is injected into the drum-shaped bale forming chamber.

The bale forming device applies pressure onto the injected crop material and forms from the injected crop material a compressed round-cylindrical bale in the bale forming chamber.

As soon as the bale diameter reaches a given value, the circumferential surface of the round-cylindrical bale is wrapped into wrapping material (a net or plastic sheet or strands of twine e.g.) while the bale is still in the interior of the casing.

A pivotal tailgate of the casing is opened.

The wrapped bale is ejected out of the casing surrounding the bale forming chamber.

The ejected bale rolls over a pivotal ramp onto the ground and is deposited on the ground.

Optionally a tilting unit (quarter turn) tilts the wrapped bale onto a front face.

Figure 1:
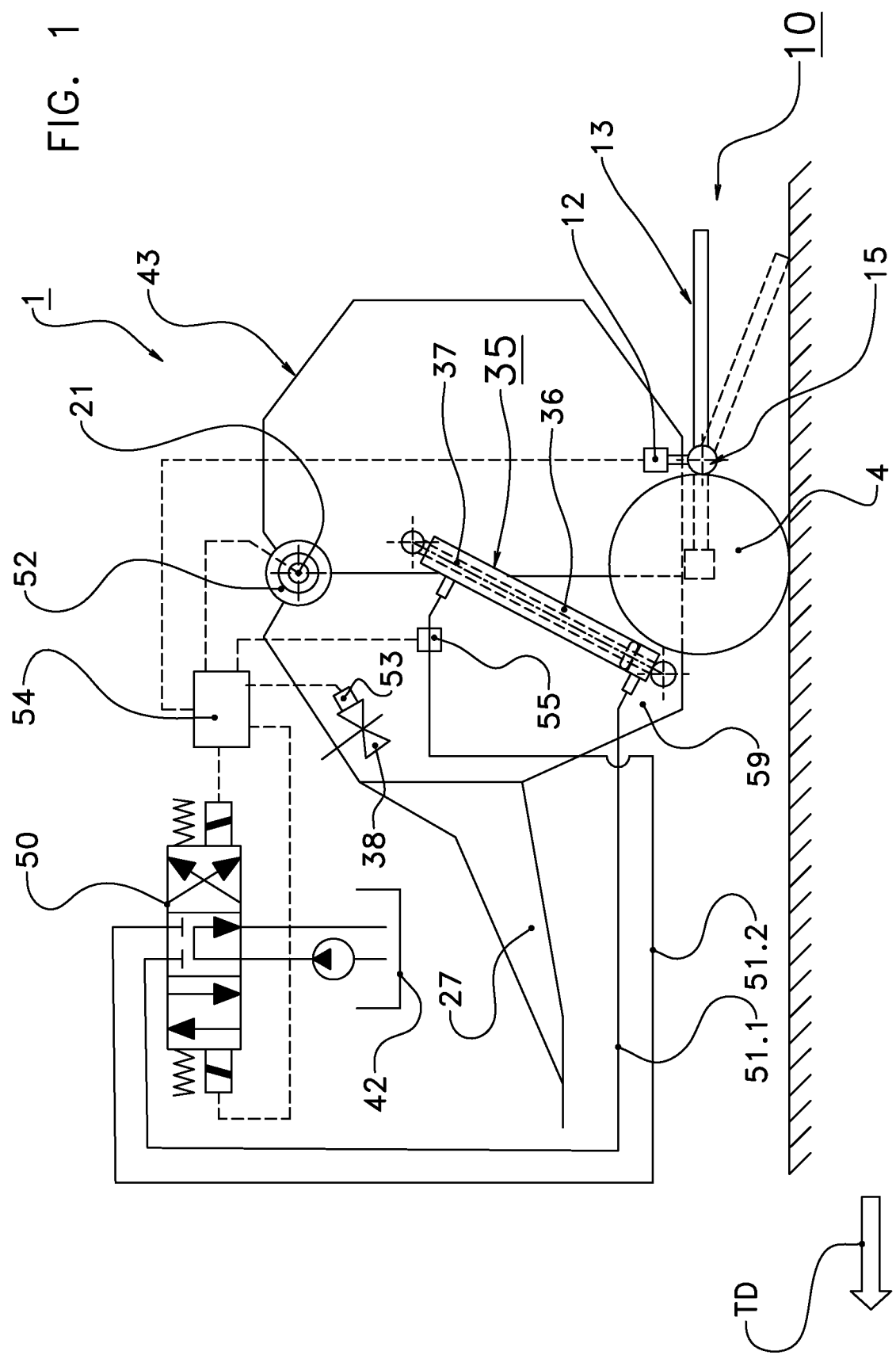
FIG. 1 shows schematically in a cross section a first implementation of a round baler on board of which an embodiment of the invention is used and the hydraulic circuit for the tailgate actuator.
Figure 2:
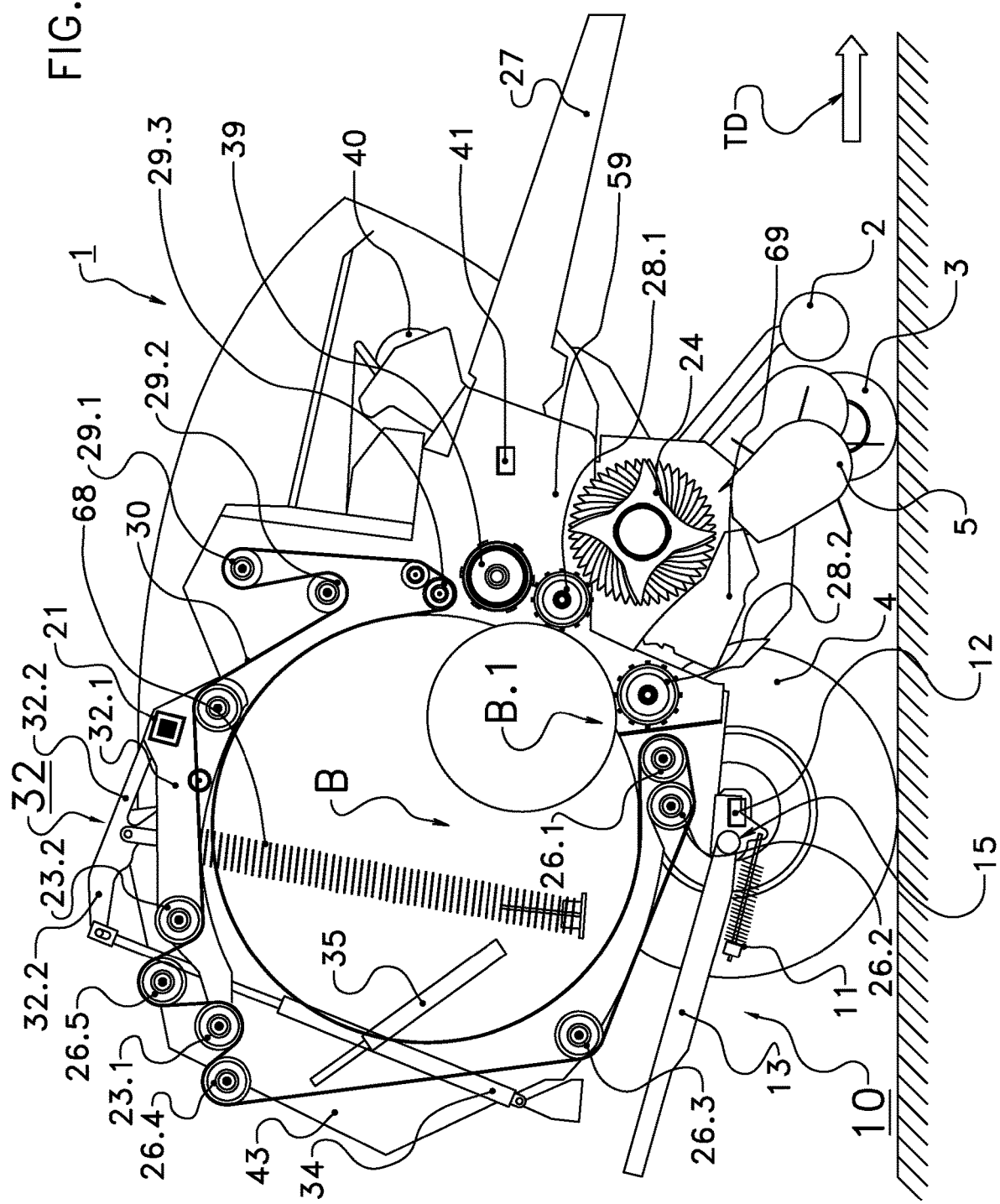
FIG. 2 shows in a cross section a second implementation of a round baler on board of which an embodiment of the invention is used.

FIG. 1 shows a first implementation of a round baler 1 on board of which the invention is implemented. FIG. 2 shows a second implementation of such a round baler 1. Coinciding parts have the same reference signs. In both implementations the baler 1 is moved over ground in the travelling direction TD (in FIG. 1 from right to left and in FIG. 2 from left to right). The baler 1 of FIG. 1 and that of FIG. 2 comprises the following parts:

a towing unit 27 for mechanically connecting the baler 1 with a pulling propelled vehicle, two ground-engaging wheels 4, a pick-up unit 5 with a rotated pick-up drum carrying several spring-mounted pick-up tines, two pick-up guiding wheels 3 for guiding the pick-up unit 5 over ground wherein the pick-up drum is positioned between the wheels 3, a pivotal downholder unit 2 arranged above the pick-up unit 5, a rotated conveying rotor 24 with several conveying stars which engage from above into the feeding channel, a sequence of knives 69 which engage from below into the feeding channel and which cooperate with the conveying rotor 24, two driven starter rollers 28.1, 28.2 which delimit the crop material inlet which guides into the bale forming chamber, an endless flexible pressing belt 30 or several parallel endless flexible pressing belts 30 surrounding the bale forming chamber, a casing with a stationary front housing 59 and a pivotal tailgate 43 serving as the discharge gate wherein the casing surrounds the or every pressing belt 30 and the starter rollers 28.1, 28.2, a tensioning device 32 for the pressing belt or belts 30 with an inner tensioning arm 32.1 and an outer tensioning arm 32.2, a hydraulic retaining device 34 for the tensioning device 32, two movable deflecting rollers 23.1, 23.2 mounted at the inner tensioning arm 32.1, several stationary guiding rollers 29.1, 29.2, . . . mounted at the stationary front housing 59, several guiding rollers 26.1, 26.2, . . . mounted at the pivotal tailgate 43, a supply reel 40 with wrapping material carried in an unrolling station (not shown), a rotated wrapping material feeding roller 39, a wrapping material inlet between the deflecting roller 29.3 and the feeding roller 39, a severing device 38 for severing a web of wrapping material, a hydraulic tailgate actuator 35 with two synchronously operating single-acting piston-cylinder devices each comprising a cylinder 36 and a piston 37, a reservoir 42 with hydraulic fluid, a controllable electro-magnetic 3/3 proportional valve 50 for controlling the hydraulic flow into the and from the hydraulic tailgate actuator 35, two hydraulic lines 51.1, 51.2 which connect the tailgate actuator 35 with the valve 50, a spring 68 which tends to close the tailgate 43, a bale ramp 10 with a pivotal ramp part 13 and a ramp spring 11, the pivoting axis 15 around which the ramp part 13 can pivot with respect to the casing 59, 43 a ramp sensor 12, optionally a rotary potentiometer 52 measuring the position of the tailgate 43, optionally a sensor 53 for monitoring the severing device 38, optionally a pressure sensor 55 which measures the pressure which the bale B applies onto the tailgate 43, optionally an inclination sensor 41, and an electronic baler control unit 54.

The round baler 1 of FIG. 1 and FIG. 2 forms one bale per time. FIG. 2 shows simultaneously an intermediate bale B.1 and a bale B with the required final diameter.

In the embodiment of FIG. 1 the tailgate 43 is directly mounted at the front housing 59 and can pivot around the pivoting axis 21. In the embodiment of FIG. 2 the inner tensioning arm 32.1 is rigidly connected with the outer tensioning arm 32.2. The outer tensioning arm 32.2 carries the tailgate 43. The tensioning device 32 comprising the tensioning arms 32.1, 32.2 is pivotal with respect to the stationary front housing 59 around the pivoting axis 21. The increasing bale B.1 tends to increase the diameter of the drum-shaped bale forming chamber and thereby tends to pivot the tensioning device 32. For actually pivoting the tensioning device 32 the adjustable retaining force of the retaining device 34 must be surpassed. Thereby the or every pressing belt 30 is tensioned by the tensioning device 32 and applies pressure onto the increasing round bale B.1. In addition a helical spring 68 tends to close the tailgate 43 and contributes to an end-position dampening for the tailgate 43.

A diameter sensor (not shown) measures the current diameter of the bale B while it increases in the bale forming chamber. As soon as the bale diameter reaches a given diameter threshold, the injection of further crop material into the bale forming chamber is interrupted.

For preventing the bale B from falling apart, the circumferential surface of the bale B is wrapped into a web of wrapping material (a net or a plastic film or twine strands e.g.) while the bale B is still in the bale forming chamber. For wrapping the circumferential surface of the bale B, a web of wrapping material is pulled from the supply reel 40 and is conveyed by the feeding roller 39 towards the bale forming chamber. The web is injected into the bale forming chamber through the wrapping material inlet which is positioned below the deflecting roller 39.3. While the bale surface is wrapped, no further crop material should be injected into the bale forming chamber. The round balers of FIG. 1 and FIG. 2 are therefore temporarily stopped. Or the injection is interrupted in an alternative manner.

When the circumferential surface of the bale B is sufficiently wrapped, the severing device 38 severs the web of wrapping material. The sensor 53 monitors the operation of the severing device 38.

The hydraulic tailgate actuator 35 opens the tailgate 43 by moving it away from the stationary front housing 59 against the force of gravity. In one implementation the tailgate actuator 35 can only open the tailgate 43 against the force of gravity, i.e. operates only in one direction. The force of gravity closes the tailgate 43 again and the tailgate actuator 35 dampens the closing movement. It is also possible that the tailgate actuator 35 can additionally close the tailgate 43, i.e. it is double-acting. Fluid is taken from a fluid reservoir 42 and is guided through the lines 51.2 into the base-side, i.e. lower chambers of the tailgate actuator 35. A control unit 54 generates control inputs for the electro-magnetic proportional valve 50. This proportional valve 50 regulates the flow of hydraulic fluid through the lines 51.1 (for closing the tailgate 43) and 51.2 (for opening the tailgate 43) into the cylinders 36 of the hydraulic actuator 35. Thereby the common velocity of the pistons 37 moving out of the cylinders 36 is regulated while the tailgate 43 is moved from the closed position away from the stationary front housing 59 into an opened position. The tailgate 43 can be moved into a fully opened position.

In one implementation a rotary potentiometer 52 measures the current rotational position of the tailgate 43, cf. FIG. 1. It is possible that the potentiometer 52 can measure the tailgate position over the entire path from the closed position to the fully opened position. It is also possible that the potentiometer 52 can only measure the tailgate position in a range of the tailgate path, e.g. in a range close to the fully opened position and optionally in a range adjacent to the closed position. It is further possible that the baler control unit 54 only processes signals from the potentiometer 52 within a movement range.

But thanks to the invention such a rotary potentiometer 52 is not needed for controlling the tailgate movement. It is also possible that the tailgate actuator 35 opens the tailgate 43 in a time-based manner with varying velocity or even with the maximal possible velocity.

It is possible that the control unit 54 obtains signals from the potentiometer 52 at least when the tailgate 43 has reached a range close to the fully opened position. This range reaches from a given intermediate tailgate position to the fully opened position. The control unit 54 triggers an end-position dampening when the tailgate 43 approaches the fully opened position. Thanks to this dampening a jerk is avoided which may otherwise occur when the tailgate 43 reaches the fully opened position without being dampened or decelerated. It is also possible that a gate contact switch detects the event that the tailgate 43 reaches a given position close to the fully opened position. This gate contact switch triggers a deceleration of the tailgate 43. The embodiment with the switch enables end-position cushioning without a tailgate position sensor.

According to the invention the tailgate 43, however, is not moved in every case, i.e. for every bale B and under every operating condition, into the fully opened position. It is also possible that the tailgate movement is stopped before the tailgate 43 reaches the fully opened position. In this case the tailgate 43 is moved into an opened position which is an intermediate position between the closed position and the fully opened position.

After the tailgate 43 is opened, the wrapped bale B is ejected out of the bale forming chamber. The formed and wrapped bale B is ejected through an aperture occurring between the tailgate 43 being in an opened position and the front housing 59. In the embodiment the or at least one tensioned pressing belt 30 supports the step of ejecting the bale B. The ejected bale B drops onto the movable ramp part 13. Before the bale B has been ejected, the helical ramp spring 11 pivots the movable ramp part 13 upwards into a raised position. The weight of the ejected bale B pivots the movable ramp part 13 downwards in a lowered position against the force of the spring 11.

The ramp sensor 12 detects a dropping event, i.e. the event that an ejected bale B drops onto the movable ramp part 13 and pivots it into the lowered position. When detecting the dropping event, the ramp sensor 12 generates a signal. This signal is transferred to the baler control unit 54, e.g. via a data bus operating according to the ISOBus Standard. The control unit 54 uses the signal for decelerating the movement of the tailgate 43, see below.

In one implementation the ramp sensor 12 comprises a lower contact sensor which is activated when the movable ramp part 13 has reached the lowered position (bale on the ramp part 13). In a further implementation the ramp sensor 12 comprises an upper contact sensor which is activated as long as the movable ramp part 13 is in the raised position (no bale on the ramp part 13). For sake of a higher reliability these implementations can be combined. In an alternative implementation a rotary potentiometer belonging to the ramp sensor 12 measures the current rotational position of the movable ramp part 13. It is also possible that the ramp sensor 12 measures the expansion or compression of the ramp spring 11. Further implementations for the ramp sensor 12 are possible.

In place of the helical spring 11 a hydraulic or pneumatic spring, e.g. a gas strut, can tend to lift the ramp part 13. The ejected bale lowers the ramp part 13 against the retaining force of this hydraulic or pneumatic spring. In place of a hydraulic or pneumatic spring a hydraulic or pneumatic actuator may be used. A sensor measures a parameter of this hydraulic or pneumatic spring or hydraulic or pneumatic actuator, e.g. the stroke or hydraulic or pneumatic pressure.

Figure 3:
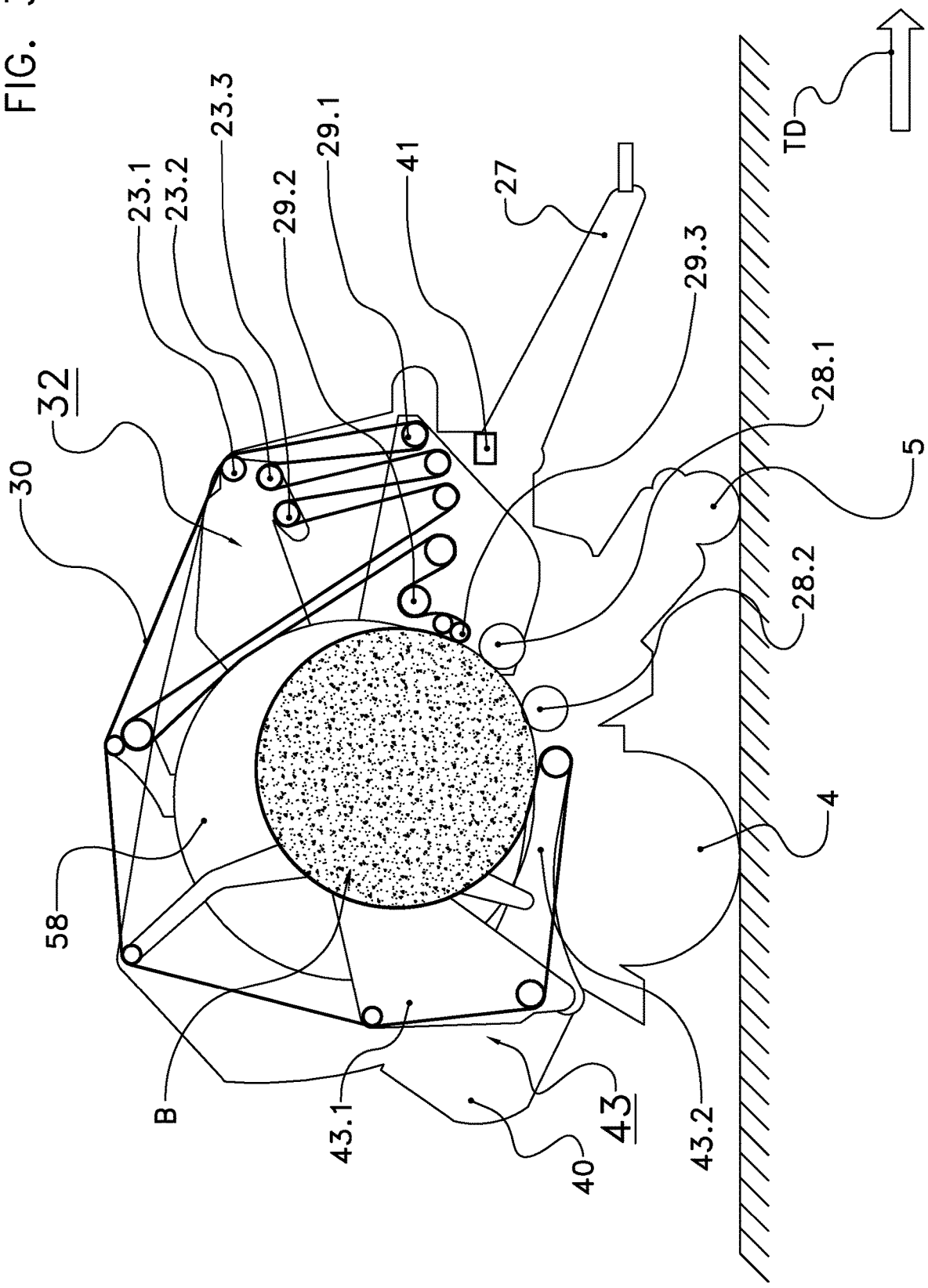
FIG. 3 shows a continuous round baler with an embodiment of the invention while a bale is formed and the tailgate is fully closed.
Figure 4:
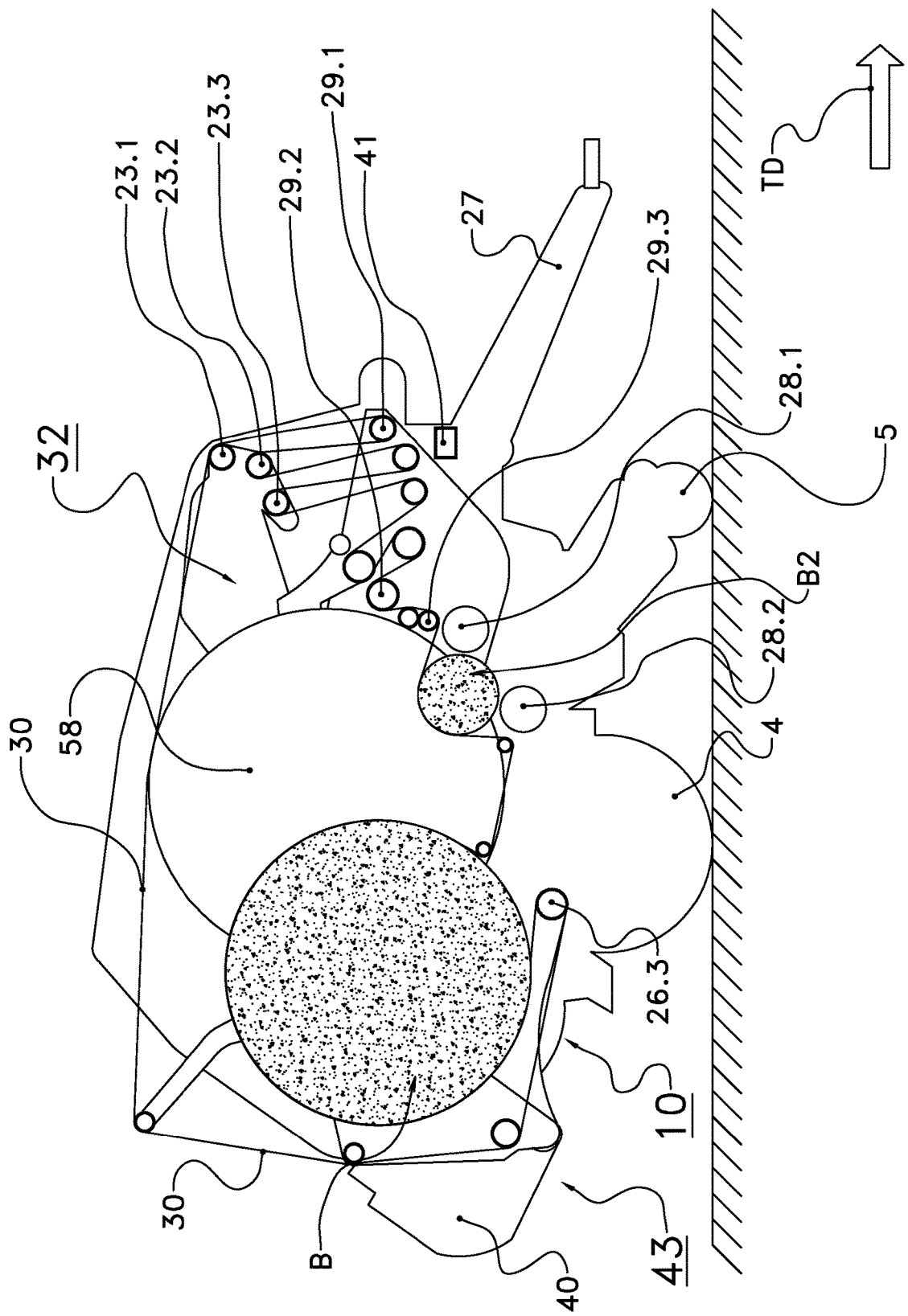
FIG. 4 shows the continuous baler of FIG. 3 while the completed bale is wrapped and the tailgate is slightly opened.
Figure 5:
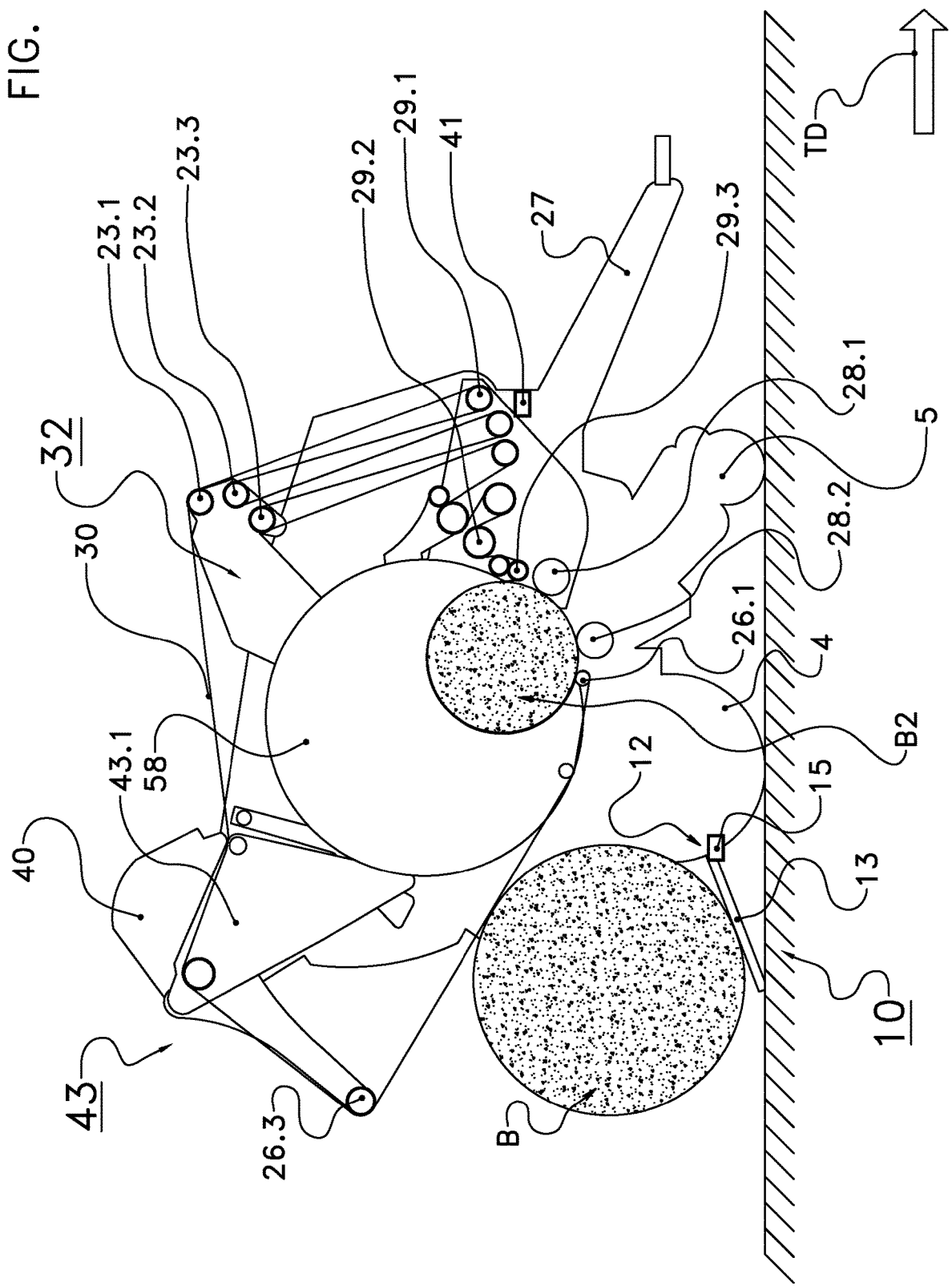
FIG. 5 shows the continuous baler of FIG. 3 with the tailgate in the opened position while the wrapped and ejected and bale rolls over the pivotal ramp downwards.

FIG. 3 to FIG. 5 show a continuous round baler as known from U.S. Pat. No. 9,258,947 B2, e.g., on board of which the invention is implemented. Coinciding parts have the same reference signs as those in FIG. 2. The bale forming chamber is positioned between two parallel rotatable discs 58. A crop material inlet is positioned between the pressing rollers 28.1 and 28.2. The tailgate 43 of the continuous baler has a pivotal tailgate frame 43.1 and a tailgate bottom 43.2 which is pivotal with respect to the tailgate frame 43.1. The supply reel is kept by an unrolling station (not shown) mounted at the tailgate frame 43.1. In the embodiment the circumference of the bale forming chamber is surrounded by one segment of one broad pressing belt 30.

In the situation of FIG. 3 the tailgate 43 is closed and a bale B is formed in the bale forming chamber. In the situation of FIG. 4 the bale B has reached the required diameter and the circumferential surface of the bale B is wrapped. The tailgate bottom 43.2 is lowered downwards and the bale B has been moved backwards out of the bale forming chamber and onto the moved tailgate bottom 43.2. The tailgate 43 remains connected with the stationary front housing while the bale surface is wrapped. At the same time a new bale B2 is formed in the bale forming chamber. In the situation of FIG. 5 the tailgate 43 is opened and the wrapped bale B is ejected and drops onto the ramp part 13. The dropped bale B causes the ramp part 13 to be pivoted downwards. The ramp sensor 12 detects a dropping event.

The tailgate velocity v=v(t) depends on the velocity with which the tailgate actuator 35 expands. The baler control unit 54 generates control inputs for the discharge gate actuator 35 such that the discharge gate 43 is moved in a time-based manner according to one of these diagrams.

When the tailgate 43 is moved as follows from the position of FIG. 4 to that of FIG. 5: The tailgate velocity v increases, i.e. the tailgate 43 is moved with increasing acceleration, until the time point T1 is reached. Now the tailgate 43 is opened with a constantly increasing velocity until the time point T2 is reached. The velocity increase is reduced until the time point T3 is reached. Now the tailgate 43 is opened with a constant velocity v_max.

The tailgate 43 remains to be moved with v_max at least until the ramp sensor 12 has detected a dropping event, i.e. that the bale B has dropped onto the movable ramp part 13. The tailgate movement is decelerated as soon as a set point S1, S2 is reached. This set point S1, S2 depends on the corresponding dropping event E1, E2 and can therefore vary from bale to bale. Two different set points S1 and S2 correspond to two dropping events E1 and E2 for two bales which are subsequently formed and which have different diameters or further differing properties. The dropping event E2 occurs after a longer time span than the dropping event E1, e.g. as the second bale has a larger diameter, a higher friction with the chamber side wall occurs or as the inclination is larger. After the dropping event E1, E2 causing the set point S1, S2 has been detected, the tailgate movement is decelerated from v_max to zero in three consecutive phases. The values T1, T2, T3, Δ1, and Δ2 are given and are programmed in the control software executed by the baler control unit 54. They remain constant from bale to bale. The set points S1 and S2 depend on the detection of the dropping event E1 and E2, resp.

In one embodiment, the dropping event E1, E2 triggers the step of decelerating the tailgate movement without any delay, i.e. the set point S1, S2 only depends on the detection of the dropping event E1, E2. Alternatively, a time span ΔT between the dropping event E1 and the set point S1 passes.

This time span ΔT can be given in advance and remains constant from bale to bale. It is also possible that the time span ΔT is automatically calculated during operation and can vary from bale to bale. It is possible that the time span ΔT depends on a measured characteristic of the bale B, e.g. on the bale diameter or bale weight or on the friction between a front face of the bale B and the adjacent sidewall of the tailgate 43 or on a crop material property. In one embodiment the time span ΔT is calculated depending on signals from the inclination sensor 41. This inclination sensor 41 measures the inclination around a horizontal axis perpendicular to the travelling direction TD. If the baler 1 travels angularly downwards, the bale B is ejected upwards against the force of gravity and the time span ΔT is enlarged.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

| LIST OF REFERENCE SIGNS | |
|---|---|
| 1 | round baler, forms round-cylindrical bales B by means of the bale forming device 28.1, 28.2, 30 |
| 2 | downholder unit with downholder roller |
| 3 | ground-engaging guiding wheels for the pick-up unit 5 |
| 4 | ground-engaging wheels of the round baler 1 |
| 5 | pick-up unit with spring-mounted pick-up tines |
| 10 | ramp with the pivotal ramp part 13 and the spring 11 |

-continued

LIST OF REFERENCE SIGNS

| | |
|---|---|
| 11 | helical spring, tends to move the moveable ramp part 13 into the raised position |
| 12 | ramp sensor, detects the position of the moveable ramp part 13, generates a signal indicating the dropping event E1, E2 |
| 13 | moveable ramp part, lifted by the spring 11 |
| 15 | pivoting axis of the ramp part 13 |
| 21 | pivoting axis for the tailgate 43 (FIG. 1) and for the tensioning device 32 (FIG. 2) |
| 23.1, 23.2, 23.3 | moveable guiding rollers, mounted at the inner tensioning arms 12.1 |
| 24 | driven conveying rotor, engages from above into the feeding channel |
| 26.1, 26.2, 26.3, ... | stationary guiding rollers for the pressing belts 10, mounted at the tailgate 43 |
| 27 | towing unit |
| 28.1, 28.2 | starter rollers, form the two borders of the crop material inlet, belong to the bale forming device |
| 29.1, 29.2, ... | stationary guiding rollers for the pressing belts 10, mounted at the front housing 59 |
| 30 | pressing belts, belong to the bale forming device |
| 32.1 | inner tensioning arm, carries the moveable guiding rollers 3.1, 3.2, 3.3 |
| 32.2 | outer tensioning arm, carries the tailgate 43, rigidly connected with the inner tensioning arm 32.1 |
| 34 | hydraulic retaining device for the tensioning device 32.1, 32.2 |
| 35 | hydraulic actuator for the tailgate 43, comprises two piston-cylinder units |
| 36 | cylinder of the tailgate actuator 35 |
| 37 | piston of the hydraulic actuator 35 |
| 38 | severing device for severing a web of wrapping material |
| 39 | wrapping material feeding roller |
| 40 | supply reel with wrapping material held by the unrolling station |
| 41 | inclination sensor |
| 42 | reservoir with hydraulic fluid |
| 43 | pivotal tailgate, pivotally connected with the front housing 59, serves as the discharge gate |
| 43.1 | tailgate frame |
| 43.2 | tailgate bottom, pivotal with respect to the tailgate frame 43.1 |
| 50 | 3/3 proportional valve |
| 51.1, 51.2 | hydraulic lines connecting the tailgate actuator 35 with the valve 50 |
| 52 | rotary potentiometer measuring the pivotal position of the tailgate 43 |
| 53 | sensor for monitoring the severing device 38 |
| 54 | baler control unit |
| 55 | pressure sensor; measures the pressure which the bale B applies onto the tailgate 43 |
| 58 | rotatable discs of the continuous baler |
| 59 | front housing |
| 68 | spring for the tensioning device 32.1, 32.2 |
| 69 | knives, engage from below into the feeding channel, cooperate with the conveying rotor 24 |
| B | completed bale in the bale forming chamber, to be ejected |
| B.1 | bale with an intermediate diameter already created during of the bale forming phase |
| B2 | further bale, created while the bale B is wrapped |
| E1, E2 | dropping events: ejected bale B drops onto the ramp 10 |
| S1, S2 | set points depending on the dropping event E1, E2: movement of tailgate 43 is decelerated |
| T1, T2, T3 | given time points of the time-based scheme for accelerating the tailgate 43 when opening the tailgate 43 |
| TD | travelling direction of the baler 1 |
| Δ1, Δ2 | given consecutive time spans for decelerating the tailgate movement after the dropping event E1, E2 has been detected |
| ΔT | time span between dropping event E1 and set point S1, can be given in advance or calculated during operation |
| v = v(t) | opening velocity of the tailgate 43, varies over time |
| v_max | maximal velocity of the tailgate 43 |

The invention claimed is:

1. A bale forming apparatus comprising
a bale forming device providing a bale forming chamber,
a casing comprising a discharge gate; and
a discharge gate actuator,
wherein the discharge gate is moveable between
  a closed position and
  a fully opened position,
wherein the casing with the discharge gate being in the closed position surrounds the provided bale forming chamber,
wherein the bale forming device is arranged to form a bale in the provided bale forming chamber while the discharge gate is in the closed position,
wherein the discharge gate actuator is arranged to move the discharge gate from the closed position into an opened position which is taken from a set of different possible opened positions,
wherein each opened position is
  either the fully opened position or
  an intermediate position between the fully opened position and the closed position, and
wherein the bale forming apparatus is arranged to eject a formed bale out of the casing while or after the discharge gate is moved into the opened position,
wherein the bale forming apparatus further comprises
  a ramp and
  a ramp sensor,
wherein the ramp is positioned vertically or angularly below the discharge gate at least when the discharge gate is in the opened position,
wherein the bale forming apparatus is arranged such that an ejected bale drops onto the ramp,
wherein when the ramp sensor is arranged to detect a dropping event that a bale drops onto the ramp, the discharge gate actuator is arranged to automatically terminate the movement of the discharge gate away from the closed position, thereby stopping the movement of the discharge gate when it has reached the opened position, triggered by the ramp sensor having detected the dropping event.

2. The bale forming apparatus according to claim 1, wherein
the bale forming apparatus is arranged to terminate the discharge gate movement triggered
  by detecting the dropping event or
  by detecting an event that the discharge gate approaches or reaches the fully opened position
depending on which event occurs earlier.

3. The bale forming apparatus according to claim 1, wherein
the bale forming apparatus comprises a biasing member and
the ramp comprises a pivotal ramp part which is pivotal between a raised position and a lower position,
wherein the biasing member tends to pivot the ramp part into the raised position, and
wherein an ejected and dropped bale pivots the ramp part into the lower position against a force of the biasing member, and
wherein the ramp sensor is arranged to detect whether the ramp part is in the lowered position or in the raised position.

4. The bale forming apparatus according to claim 1, wherein
the bale forming apparatus comprises a scale,
wherein the scale is arranged to measure a value indicative of a weight of a bale on the ramp and
wherein the scale further serves as the ramp sensor.

5. The bale forming apparatus according to claim 1, wherein
the bale forming apparatus comprises a decelerating device arranged to decelerate the movement of the discharge gate
when the discharge gate approaches the fully opened position.

6. The bale forming apparatus according to claim 1, wherein
the bale forming apparatus comprises a gate position sensor arranged to detect that the discharge gate approaches the fully opened position,
wherein the discharge gate actuator is arranged to decelerate the movement of the discharge gate
depending on at least one signal from the gate position sensor.

7. The bale forming apparatus according to claim 1, wherein
the discharge gate actuator is arranged to terminate the discharge gate movement when
the ramp sensor has detected the dropping event and
a time span has passed after the dropping event is detected.

8. The bale forming apparatus according to claim 1, wherein
the discharge gate actuator is arranged to move the discharge gate according to a time-based scheme until
the ramp sensor detects the dropping event or
the discharge gate approaches or reaches the fully opened position.

9. The bale forming apparatus according to claim 1, wherein
the bale forming apparatus comprises an inclination sensor which is arranged to measure a value indicative of a current inclination of the bale forming apparatus,
wherein the discharge gate actuator is arranged to terminate the discharge gate movement depending on signals
from the ramp sensor and
from the inclination sensor.

10. A vehicle arranged for being moved over ground and comprising a bale forming apparatus, the bale forming apparatus comprising:
a bale forming device providing a bale forming chamber,
a casing comprising a discharge gate; and
a discharge gate actuator, wherein the discharge gate is moveable between a closed position and a fully opened position,
wherein the casing with the discharge gate being in the closed position surrounds the provided bale forming chamber,
wherein the bale forming device is arranged to form a bale in the provided bale forming chamber while the discharge gate is in the closed position, wherein the discharge gate actuator is arranged to move the discharge gate from the closed position into an opened position which is taken from a set of different possible opened positions,
wherein each opened position is either the fully opened position or an intermediate position between the fully opened position and the closed position, and
wherein the bale forming apparatus is arranged to eject a formed bale out of the casing while or after the discharge gate is moved into the opened position,
wherein the bale forming apparatus further comprises a ramp and a ramp sensor,
wherein the ramp is positioned vertically or angularly below the discharge gate at least when the discharge gate is in the opened position, wherein the bale forming apparatus is arranged such that an ejected bale drops onto the ramp,
wherein when the ramp sensor is arranged to detect a dropping event that a bale drops onto the ramp, the discharge gate actuator is arranged to automatically terminate the movement of the discharge gate away from the closed position, thereby stopping the movement of the discharge gate when it has reached the opened position, triggered by the ramp sensor having detected the dropping event.

11. A method for forming a bale by using a bale forming apparatus comprising
a bale forming device providing a bale forming chamber,
a casing comprising a discharge gate which is moveable between a closed position and a fully opened position,
a discharge gate actuator,
a ramp, and
a ramp sensor,
wherein the casing with the discharge gate being in the closed position surrounds the provided bale forming chamber and
wherein the method comprises the steps that
the bale forming device forming a bale in the provided bale forming chamber while the discharge gate is in the closed position,
the discharge gate actuator moving the discharge gate from the closed position into an opened position which is taken from a set of different possible opened positions,
wherein each opened position is either the fully opened position or an intermediate position between the fully opened position and the closed position, and
ejecting the formed bale out of the casing while and/or after the discharge gate is moved into the opened position,
wherein the method comprises the further steps that
dropping the ejected bale onto the ramp,
the ramp sensor automatically detecting the dropping event that the ejected bale drops onto the ramp, and
when the ramp sensor detects the dropping event automatically triggering the discharge gate actuator terminating the movement of the discharge gate away from the closed position such that the discharge gate is stopped when reaching the opened position.

12. The bale forming method according to claim 11,
wherein a step that the discharge gate movement is decelerated is triggered
by the bale dropping event or
by an event that the discharge gate approaches or reaches the fully opened position
depending on which event occurs earlier.

13. The bale forming method according to claim 11,
wherein the bale forming apparatus comprises an inclination sensor,
wherein the method comprises the further steps that
the inclination sensor measuring a value indicative of a current inclination of the bale forming apparatus and
the discharge gate actuator terminating the movement of the discharge gate away from the closed position after
the ramp sensor detecting the dropping event and
a time span has passed after detecting the bale dropping event,
wherein the time span is automatically calculated depending on signals from the inclination sensor.

14. The bale forming method according to claim 13,
wherein the bale forming apparatus comprises a decelerating device,
wherein the method comprises decelerating the movement of the discharge gate with the decelerating device when the discharge gate approaches the fully opened position.

\* \* \* \* \*